United States Patent [19]

Shapiro et al.

[11] Patent Number: 4,760,593
[45] Date of Patent: Jul. 26, 1988

[54] PERSONAL ALARM SYSTEM PROVIDING HANDSFREE OPERATION

[75] Inventors: L. Dennis Shapiro, Chestnut Hill; Robert M. Armington, Melrose; Theodore Bially, Sudbury; Philip H. Devlin, Dorchester, all of Mass.

[73] Assignee: Lifeline Systems, Inc., Watertown, Mass.

[21] Appl. No.: 920,240

[22] Filed: Oct. 17, 1986

Related U.S. Application Data

[63] Continuation-in-part of Ser. No. 734,920, May 16, 1985, abandoned.

[51] Int. Cl.⁴ .................... H04M 11/04; H04M 1/64
[52] U.S. Cl. ......................................... 379/38; 379/70
[58] Field of Search ................. 379/37, 38, 40, 41, 379/50, 51, 52, 70, 79, 106, 39, 388, 420

[56] References Cited

U.S. PATENT DOCUMENTS

| | | |
|---|---|---|
| 3,662,111 | 5/1972 | Rubinstein ............... 179/5 P |
| 3,811,012 | 5/1974 | Barber . |
| 3,925,622 | 12/1975 | Robinson ............... 379/51 X |
| 4,338,493 | 7/1982 | Stenhuis et al. ........ 379/50 X |
| 4,405,833 | 9/1983 | Cave et al. . |
| 4,608,458 | 8/1986 | Hashimoto ............... 379/70 |

FOREIGN PATENT DOCUMENTS

| | | |
|---|---|---|
| 0017448 | 10/1980 | European Pat. Off. . |
| 0021425 | 1/1981 | European Pat. Off. . |
| 0070993 | 2/1983 | European Pat. Off. . |
| 0096401 | 12/1983 | European Pat. Off. . |
| 2832374 | 7/1978 | Fed. Rep. of Germany . |
| 2166321 | 4/1986 | United Kingdom ......... 379/51 |

OTHER PUBLICATIONS

Capital Controls Company, Inc, "Advance Series 1520 Automatic Dialing Alarm Monitor Instruction Manual," pub. No. 385-2, 3/85, ©1985 by Capital Control, Colmar, Pa.

Ericsson Review, vol. 58, No. 2, 1981, pp. 96-100, Stockholm, Sweden; A. Lennstrom et al., "Ericare".

Primary Examiner—Keith E. George
Attorney, Agent, or Firm—Weingarten, Schurgin, Gagnebin & Hayes

[57] ABSTRACT

A personal alarm system is disclosed which incorporates a speakerphone so as to permit substantially handsfree operation and remote activation. The system includes a speakerphone which interfaces to a subscriber station. The subscriber station in turn interfaces over a communications link to a central monitoring station which is operative to receive and analyze messages transmitted to the central monitoring station by the subscriber station. Following transmission of a message from the subscriber station to the central monitoring station, the central monitoring station may transmit a control signal to the subscriber station which causes the subscriber station to activate the speakerphone to permit verbal communication with a subscriber who may be immobilized and/or physically unable to initiate a telephone call or answer a telephone. The system further includes an automatic phone answering mode following the activation of a switch by a subscriber, a remote phone answering mode at the subscriber's location, and remote message mode for informing a caller to stand by while the subscriber comes to the phone. In a particular system, some or all operating modes may be employed.

11 Claims, 3 Drawing Sheets

4,760,593

PERSONAL ALARM SYSTEM PROVIDING HANDSFREE OPERATION

CROSS-REFERENCE TO RELATED APPLICATION

The present application is a continuation-in-part of U.S. patent application Ser. No. 734,920, now abandoned, filed on May 16, 1985.

FIELD OF THE INVENTION

This invention relates to a monitoring device for the aged or infirm and more specifically to a personal alarm system including a remotely activatable speakerphone system which is capable of substantially handsfree operation.

BACKGROUND OF THE INVENTION

Many people who are aged or incapacitated and who either Clive alone or who are unattended for prolonged periods of time may be unable to summon help should such be required. Such individuals may, in extreme situations, expire or suffer irreparable personal harm or further injury resulting from their inability to summon assistance. To address this problem, personal alarm systems such as those disclosed in U.S. Pat. No. 4,524,243 of the same assignee as the present invention and the apparatus disclosed in U.S. Pat. No. 3,662,111 have been developed. While these systems permit a central monitoring station to ascertain if a subscriber is active, such systems do not provide means to establish verbal communication with a subscriber. It is obviously desirable to be able to communicate with a subscriber in order to ascertain his medical condition. However, it will be appreciated, that in certain circumstances, a subscriber may be unable to initiate a telephone call due to the subscribers's immobility or incapacity and the subscriber may not have the ability to lift a telephone handset in order to respond to an incoming call.

SUMMARY OF THE INVENTION

In accordance with the present invention an improved personal alarm system is disclosed. The alarm system includes at least one subscriber station and a central monitoring station having the capability to monitor a plurality of subscriber stations. In the event of subscriber inactivity, or in the event a subscriber activates a "help button" to indicate assistance is required, the subscriber station transmits an alarm message containing subscriber identification information over a communications link to the central monitoring station. Upon receipt of the alarm message at the central monitoring station, help may be dispatched to the subscriber needing assistance or other appropriate action may be initiated.

The subscriber station in accordance with the present invention includes a message unit which may be activated upon the transmission of a control signal from the subscriber to the subscriber station and can transmit via the phone line a message to an incoming caller without any movement or intervention by the subscriber. The subscriber station also includes a speakerphone which may be activated by transmission of a control signal from the central monitoring station to the subscriber station so as to permit an immobile and/or incapacitated subscriber to verbally communicate with an operator at the central monitoring station without the need for any physical intervention or movement by the subscriber.

The system further includes a mode of operation in which the subscriber's phone is automatically answered and the speakerphone is activated in response to incoming calls following the activation of the help button or another switch by a subscriber. Additionally, the system includes an operating mode wherein the phone is answered and the speakerphone activated if the help button is activated during the time period in which the subscriber's phone is ringing. Since a subscriber may be immobile, incapacitated or unable to perform such simple acts as lifting a telephone handset, the disclosed apparatus and method of operation permits verbal communication between an operator at the central monitoring station and the subscriber where otherwise such might not be possible.

The term "on hook" as used herein, refers to the electrical state corresponding to that in which the telephone handset of a conventional telephone is disposed in the telephone cradle and conditioned to receive an incoming call. The term "off hook" refers to that electrical state in which the respective party's telephone instrument is connected to the communication link. The "telephone off hook" condition refers to the state in which the telephone handset is connected to the telephone communication link. The telephone "speakerphone off hook" condition refers to the states in which the respective equipment is connected to the link for conversations between the subscriber and the other party. Similarly, the "telephone" and "speakerphone" on hook conditions refer to the states in which the respective equipment is disconnected from the telephone communications link.

Following transmission of the alarm message, the subscriber station produces a timer output signal which remains active for a predetermined interval. A control signal may be automatically generated by the central monitoring station following transmission of the alarm message or may be initiated by the central monitoring station operator prior to expiration of the timer signal. If a control signal is transmitted from the central monitoring station to the subscriber station during the timer interval, a speakerphone interfaced to the subscriber station is activated so as to permit conversation between the subscriber and the operator at the central monitoring station. The speakerphone remains off hook so as to permit conversations between the central monitoring station operator and the subscriber until the central monitoring station operator terminates the call. The central monitoring station produces a simulated dial tone signal just prior to termination of the communication. In response to the simulated dial tone signal, the subscriber station produces a call termination signal which causes the subscriber station to enter a speakerphone on hook state thereby terminating the connection to the telephone link, all without manual intervention by the subscriber.

The activation of a help button produces a status signal within the subscriber station which indicates that the speakerphone is in an "enabled" state. In this state, the subscriber station automatically answers subsequent telephone calls and activates the speakerphone to permit the subscriber to converse with the calling party, again without manual intervention by the subscriber. When the calling party hangs up, the telephone network produces a dial tone. The subscriber station, in response to this dial tone, produces a call termination signal which causes the speakerphone to go on hook, thereby terminating the call and conditioning the subscriber station for receipt of subsequent calls.

Upon actuation of a reset switch located on the subscriber station or another switch provided for the present purpose, the speakerphone status signal is reset to the disabled state. While the speakerphone status signal is in the "disabled" state the subscriber station does not automatically answer incoming calls. In the speakerphone disabled state, the telephone may be answered by a subscriber in the conventional manner by lifting the telephone handset or, as explained below, by activating a "help button" while the phone is ringing. Speakerphone operation is automatically reactivated upon the presentation of a control signal to the subscriber station by the central monitoring station in the manner previously described.

The subscriber can activate the speakerphone and at the same time cause a speakerphone off hook condition by activating the help button in a hand held unit typically retained on the subscriber's person while the subscriber's telephone is ringing; that is, during a ringing interval, or by activating another switch provided for this purpose. Upon the occurrence of these concurrent events, the subscriber station produces a speakerphone off hook condition, and activates the speakerphone so as to permit the calling party and the subscriber to converse without the need for the subscriber to lift the telephone handset. After the calling party hangs up his hand set or otherwise disconnects from the telephone link, the subscriber station senses a dial tone signal produced by the telephone network and produces a speakerphone on hook condition thereby terminating the call. The subscriber may also terminate a call by actuation of the help button, thereby causing return to the on hook condition.

The subscriber can also remotely answer the telephone and inform an incoming caller to stand by while the subscriber comes to the phone. During the time interval in which the subscriber's telephone is ringing, the subscriber can activate a switch, which may be the help button, to transmit and electrical, optical, or acoustical signal to the subscriber station which correspondingly triggers the message unit in the subscriber station. This message unit then sends a synthesized or actual voice message or a tone or other coded signal via the phone line to advise the caller to wait until the subscriber answers the telephone. Alternatively, a microphone at the message unit can be activated so that the subscriber can advise the caller that he is coming to the phone. The voice channel may also be activated to permit the subscriber to speak and/or listen to the caller. In a further mode of operation, the subscriber station can automatically answer the telephone after a predetermined ringing interval or predetermined number of rings, to thereby permit the subscriber or caller to speak even if remote from the phone.

Following activation of the speakerphone in any of the above described manners, the speakerphone can remain in the enabled mode until such time as the reset switch on the subscriber station or a substitute therefore is actuated.

For some purposes, the invention can be employed with a receiving station other than a central monitoring station. For example, an elderly or ailing subscriber can have a subscriber station which can communicate with a preassigned calling party who has a conventional telephone.

DESCRIPTION OF THE DRAWINGS

The invention will be more fully understood by reference to the following discussion in conjunction with the accompanying drawings in which.

DETAILED DESCRIPTION OF THE INVENTION

In accordance with the present invention a personal alarm system is disclosed which permits a subscriber, who may be immobilized and/or incapacitated to verbally communicate with an operator at a central monitoring station without the usual requirements of manually dialing a telephone number or lifting a telephone handset. The system also provides the subscriber with the capability to remotely inform an incoming caller to stand by while the subscriber comes to the phone, by activating a switch while the telephone is ringing. Additionally, the system provides a subscriber with the ability to remotely answer the telephone by activating a "help button" or a like switch while the telephone is ringing. In an auto-answering or "speakerphone enabled" mode, initiated following actuation of the "help button", the system automatically answers all incoming calls and activates a speakerphone to permit verbal communications between the subscriber and the calling party without manual intervention by the subscriber. The disclosed system employs a speakerphone so as to allow communication between the subscriber and an operator at the central monitoring station despite the fact that a subscriber may not be proximate to, or able to handle a telephone handset. Control functions such as dialing and call termination are automatic so as to permit substantially handsfree operation. The system is primarily intended for the elderly, infirm, or incapacitated who are unattended and/or living alone and who, in the event of illness or sudden injury, might be unable to summon addistance in the event such is required.

Figure 1:
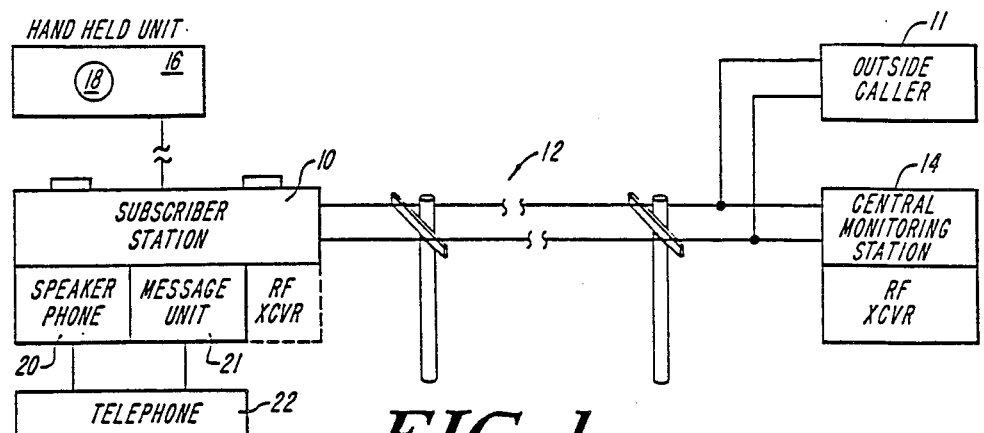
FIG. 1 is a system block diagram.

Referring to FIG. 1, there is shown a personal alarm system of the type herein disclosed. The system includes a subscriber station 10, a communications link 12 and a central monitoring station 14. In a preferred embodiment of the invention the communications link 12 is a telephone network communications link employing well known telephone network protocols. It is appreciated that the present invention may also be practiced employing other communications links such as a radio frequency or hard wired communication links. When a radio frequency communication link is employed, the subscriber station and the central monitoring station include radio frequency transceivers as shown in FIG. 1.

As further illustrated in FIG. 1, the system further includes a hand held unit 16 incorporating a help button 18. Typically a subscriber maintains the hand held unit 16 on his person and, in the event assistance is required, activates the help button 18. In response thereto, the subscriber station 10 transmits a message over the communication link 12 to the central monitoring station 14. The message contains at least subscriber identifying information so as to permit an operator at the central monitoring station 14 to dispatch assistance to the subscriber if it is believed such assistance is required. The hand held unit 16 may interface to the subscriber station 10 via a hard wired connection, a radio frequency link, an infrared link or any other suitable means operative to signal the subscriber station 10 that the help button 18 has been activated.

The personal alarm system further includes a message unit 21 which interfaces to and is activated under the control of the subscriber station 10. The message unit 21 presently referred to is a device which stores and transmits a synthesized or actual voice message or a tone or other coded signal upon receipt of the proper triggering sequence. Typically, the subscriber maintains a hand held unit 16 on his person and, when the telephone rings, activates the help button 18. In response thereto, the subscriber station 10 triggers the message unit 21 which transmits a synthesized or actual voice message or a tone or other coded signal through the subscriber station 10, over the communications link 12, and to the outside caller 11. The transmitted signal informs the outside caller 11 to wait while the subscriber comes to answer the telephone or speakerphone.

The personal alarm system also includes a speakerphone 20 which interfaces to and is activated under the control of the subscriber station 10. A standard telephone 22 also interfaces to the communication link through the speakerhone 20. The speakerphone 20 presently referred to is a device which incorporates a speaker and a microphone and which permits a user to carry on a telephone conversation by speaking at normal volumes in the vicinity of the device. Voice is picked up by a microphone and converted to electrical signals which are transmitted over the communication link 12 to a remote party. Conversely, electrical signals corresponding to the voice of the remote party are amplified and applied to the speaker of the speakerphone 20 to permit one in the vicinity of the speakerphone 20 to hear the voice of the remote party.

Following transmission of a message containing subscriber identifying information from the subscriber station 10 to the central monitoring station 14, the central monitoring station 14 may, either automatically or upon initiation by an operator at the central monitoring station 14, transmit a control signal back to the subscriber station 10. The control signal causes the subscriber station 10 to maintain the telephone network in a speakerphone off hook condition and activates the speakerphone 20 so as to permit communication between the operator and the subscriber. The operator, by reason of the ability to converse with a subscriber who may be immobilized, may obtain timely information with respect to the subscriber's medical and/or personal needs and may thereby take more appropriate and specific action than would be otherwise possible.

Figure 2:
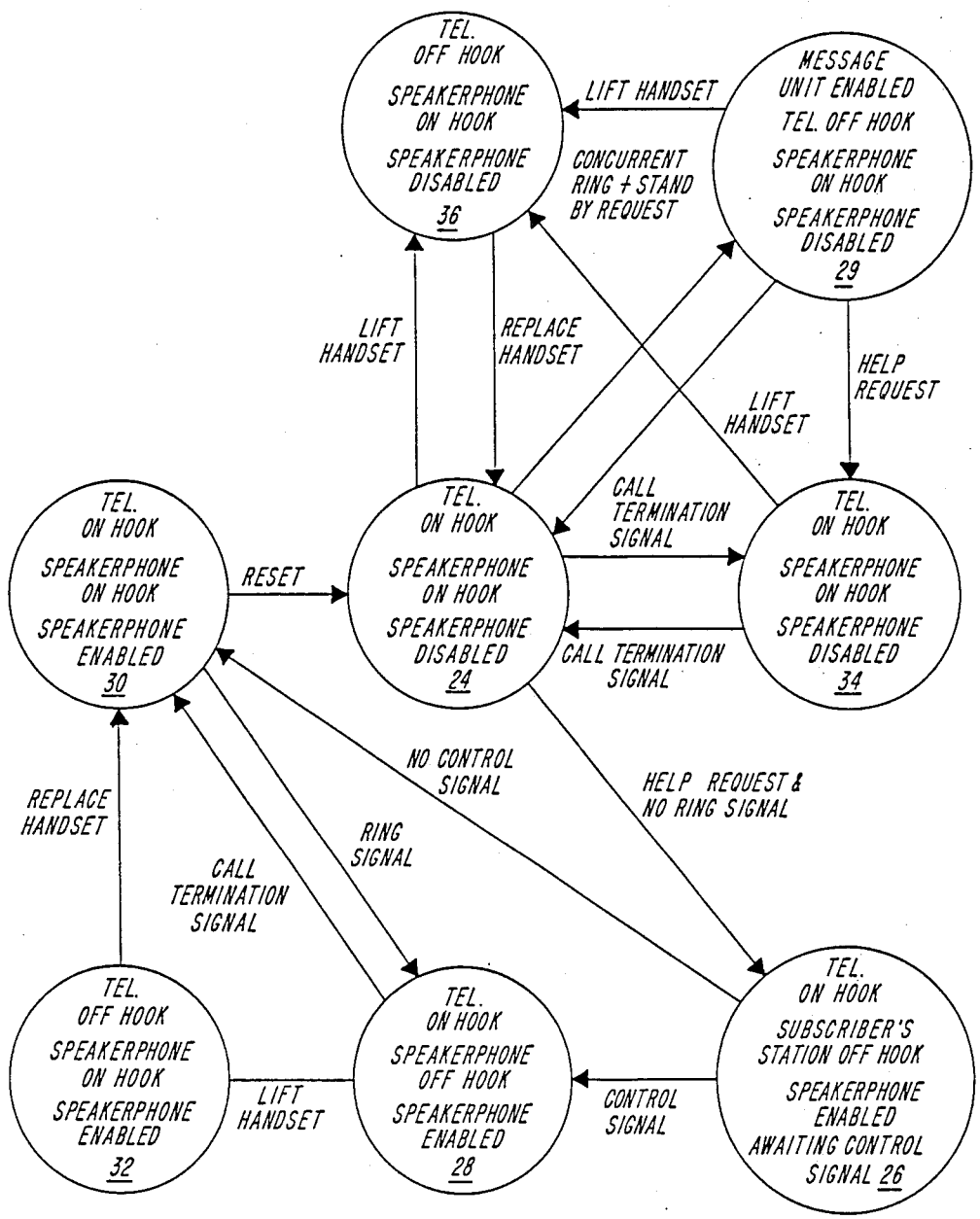
FIG. 2 is a system state diagram.

Operation of the system in accordance with the present invention is illustrated in the state diagram of FIG. 2. Following receipt of a reset signal, the subscriber station 10 is in a state in which both the telephone 22 and the speakerphone 20 are on hook awaiting a telephone call. If the help button 18 has not previously been activated, the system would be in the "speakerphone disabled" state. These conditions are illustrated in state 24 of the state diagram of FIG. 2. In the event of a "help request" resulting from subscriber activation of the help button 18, or from an inactivity alarm such as described in U.S. Pat. No. 3,662,111 or U.S. Pat. No. 4,524,243, the subscriber station 10 goes into an off hook condition, automatically dials the telephone number of the central monitoring station 14, and transmits a message containing subscriber identifying information to the central monitoring station 14. As a consequence of the help request, a speakerphone status bit is enabled. Following transmission of the subscriber identifying message, the subscriber station 10 remains in state 26 awaiting transmission of a control signal from the central monitoring station 14. In a preferred embodiment of the invention the control signal is in the form of an electrical signal of a prescribed frequency.

A timer in the subscriber station 10 is initiated following transmission of the subscriber identifying the message from the subscriber station 10 to the central monitoring station 14. The timer remains active for a preselected interval which is typically in the range of several seconds. If, within the active timer interval, the subscriber station 10 receives the control signal transmitted by the central monitoring station 14, the subscriber station 10 activates the speakerphone 20 and the establishes a control state in the subscriber station 10 so the subscriber station 10 will remain in a speakerphone off hook condition, all as illustrated in state 28 of FIG. 2. While the subscriber station 10 is in the speakerphone off hook condition, telephone discussions between the subscriber via the speakerphone and an operator at the central monitoring station 14 are possible. Upon the conclusion of discussions between the operator and the subscriber, the operator causes the central monitoring station to transmit a simulated dial tone and then terminates the call by hanging up the handset. The subscriber station 10 decodes the simulated dial tone signal and in response thereto produces a call termination signal which caues the subscriber station 10 to exit the speakerphone off hook state 28 and to enter the speakerphone on hook state 30. The subscriber station 10 remains in the speakerpone on hook state 30 until such time as the subscriber station 10 is reset, or until such time as the subscriber station 10 detects a ring signal associated with an incoming telephone call. Upon detection of a reset signal, the subscriber station 10 returns to the speakerhone on hook, speakerphone disabled state 24. In the event the subscriber station 10 detects a telephone ring signifying an incoming call, the subscriber station 10 produces a ring signal which in turn causes the subscriber station 10 to exit the speakerphone on hook speakerphone enabled state 30 and to enter the speakerphone off hook state 28 thereby permitting conversations between the calling party and a subscriber proximate the speakerphone 20 without any manual intervention by the subscriber.

If the subscriber lifts the telephone handset of the telephone interfaced to the speakerphone, as illustrated in FIG. 1, while the subscriber station 10 is in state 28, the telephone goes off hook, the speakerpone enters the on hook state and the speakerphone remains enabled as illustrated in state 32. This state change avoids the possibility of undesirable feedback between the speakerphone and the telephone handset as might occur if both the telephone and the speakerphone were off hook simultaneously. As illustrated in FIG. 2, when the subscriber hangs up the telephone handset, the subscriber station 10 exits state 32 and enters state 30 in which both the telephone and the speakerphone are on hook with the speakerphone enabled to automatically answer subsequent calls.

The subscriber station 10 exits state 28 and enters state 30 upon detection of a call termination signal. If the call was initiated by the subscriber station, the call termination signal is produced upon decode of a simulated dial tone presented by the central monitoring station. If the subscriber station was called by a calling party, when the calling party hangs up, the telephone network produces a dial tone which is decoded to produce the call termination signal at the subscriber station 10. In response to this call termination signal, the subscriber station 10 exits state 28 and enters state 30, conditioned to answer subsequent calls.

If the subscriber station 10 does not detect a control signal within the prescribed timer interval while in state 26, at the end of such interval, the subscriber station 10 exits state 26 and enters state 30, in which the speakerphone is enabled to receive subsequent incoming calls.

In another mode of operation, in which both the speakerphone and the telephone are on hook and in which the speakerphone is disabled, a subscriber proximate the subscriber station 10, may cause the speakerphone to become active upon the occurrence of an incoming telephone call though the speakerphone remains in the disabled state. The subscriber station 10 includes a circuitry which decodes a signal on the telephone link during telephone ringing and the subscriber station produces a telephone ring signal upon the decode thereof. If a subscriber activates the help button 18 in the hand help unit 16 or another switch provided for this purpose, concurrent with the ring signal, the subscriber station 10 exits the on hook disabled state 24 and enters the speakerphone off hook state 34 as illustrated in the state diagram of FIG. 2. Thereafter, when the calling party terminates the call, a dial tone signal appears on the telephone communication link which is decoded to produce a call termination signal which causes the subscriber station 10 to exit the speakerphone off hook state 34 and to reenter the on hook state 24.

If the subscriber lifts the telephone handset while the subscriber station 10 is in the speakerphone off hook disabled state 34, the station enters the telephone off hook speakerphone on hook state 36 as shown. In state 36, the speakerphone status signal remains disabled. When the subscriber terminates the call by hanging up the telephone handset, the subscriber station reenters state 24 in which both the telephone and speakerphone are on hook and the speakerphone status remains disabled.

When the subscriber station 10 is in the speakerphone on hook disabled state 34, a telephone at the subscriber's location may also be answered in the conventional manner by lifting the handset to cause the telephone to enter the on hook state with the speakerphone disabled as illustrated in state 36. Replacement of the telephone handset on the telephone cradle produces the conventional result of terminating the telephone call and causes the subscriber station 10 to transfer from the speakerphone on hook, telephone off hook state 36 to the speakerphone one hook, telephone on hook state 24.

In another mode of operation, in which both the speakerphone 20 and the telephone 22 are on hook, a subscriber may cause the message unit 21 to become active upon the occurrence of a telephone call. If a subscriber activates the help button 18 in the hand held unit 16 during the ring interval, the subscriber station 10 exits the hook disabled state 24 and enters the message unit enabled state 29 as illustrated in the state diagram in FIG. 2. The message unit 21 transmits a synthesized or actual voice message or a tone or other coded signal through the communications link informing the caller to wait while the subscriber answers the telephone. Thereafter, the subscriber answers the phone by either activating the help button 16, which places the subscriber station into the speakerphone off hook state 24, or by manually lifting the telephone handset which causes the subscriber station to enter the telephone off hook speakerphone on hook state 36.

Alternatively, activation of the help button place during the ring interval can cause the activation of a microphone at the subscriber station for one way voice communication from the subscriber to the incoming caller so that the subscriber can indicate that he or she is coming to the phone. The message unit 21 can be part of the subscriber station or can be a separate device which can be activated by the subscriber by way of the help button or other actuating switch or unit. If the message unit is external to the subscriber station it can be in communication therewith by a wired or wireless path.

The system is also operative in another mode in which after a predetermined number of rings, the subscriber station automatically enters an off-hook state to automatically answer the phone and open up the speakerphone so that the subscriber can tell the incoming caller that he or she is coming to the phone. This mode of operation is also of benefit to a subscriber who may be incapacitated and cannot press the help button or is not wearing the help button when in an incoming call is received. Even if the subscriber cannot speak when the incoming call is automatically answered, a concerned caller might be able to communicate or hear some sign of distress and announce to the incapacitated subscriber that assistance is being summoned.

Figure 3:
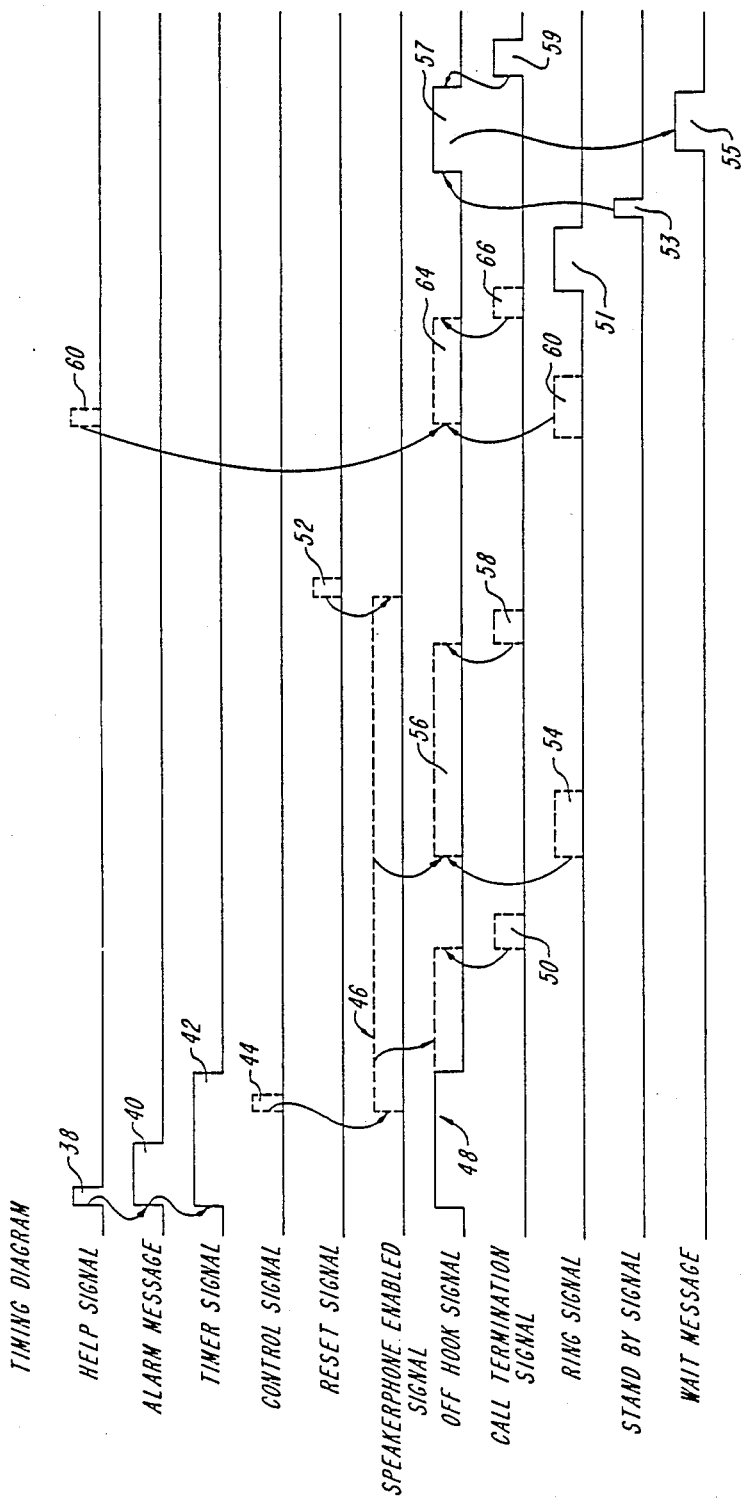
FIG. 3 is a system timing diagram.

The invention will be further understood by reference to the timing diagram of FIG. 3. Activation of the help button 18 produces a help signal 38 in the subscriber station 10. The help signal 38 causes the subscriber station 10 to go off hook dial the telephone number of the central monitoring station 14 and to transmit an alarm message 40 containing subscriber identifying information. The subscriber station 10 includes a timer which is initiated in response to the transmission of the alarm message 40 to produce a timer signal 42 which remains active for a preselected interval, typically in the range of several seconds. Following receipt of the alarm message 40, the central monitoring station 14 may transmit a control signal 44 to the subscriber station 10. If the control signal 44 is received by the subscriber station 10 within the interval during which the timer signal 42 is active, the subscriber station 10 sets a bit indicating that the subscriber station 10 is in the "speakerphone enabled" state which is shown by the speakerphone enabled signal 46. If no control signal 44 is received by the subscriber station 10 during the interval of the timer signal 42, the subscriber station 10 goes on hook at the end of the interval as shown by the off hook signal 48. If a control signal 44 is received during the interval of the timer signal 42, the subscriber station 10 remains off hook beyond the expiration of the interval of timer signal 42 and the speakerphone goes off hook permitting discussions between the subscriber and the central station 14 operator. When the operator at the central monitoring station 14 terminates a conversation with the subscriber, a simulated dial tone signal appears on the telephone line which is decoded to produce a call termination signal 50. The call termination signal 50 causes the system to exit the speakerphone off hook state 28 and to enter the speakerphone on hook state 30 as illustrated in FIGS. 2 and 3, thus conditioning the subscriber station 10 for receipt of subsequent telephone calls.

Thereafter, the subscriber station 10 remains in the speakerphone enabled state 30 as illustrated by the speakerphone enabled signal 46 until such time as the subscriber station 10 is reset upon activation of a reset signal 52.

In the event the telephone at the subscriber's location rings, the subscriber station 10 decodes the signal on the telephone line to produce a ring signal 54. If the subscriber station 10 is in the speakerphone enabled state 30 as indicated by the speakerphone enabled signal 46 and subscriber station 10 control circuitry detects the ring signal 54, the subscriber station 10 produces an off hook signal 56 and causes the subscriber station 10 to enter the off hook state 28 thereby permitting speakerphone communication between the calling party and the subscriber. A specified time after the calling party hangs up his telephone handset a dial tone signal appears on the telephone line which is decoded to produce a call termination signal 58. The call termination signal 58 is employed in the manner previously discussed to cause the system to exit the speakerphone off hook state 28 and to enter the speakerphone on hook state 30.

Another mode of operation of the subscriber station 10 is illustrated in the right hand portion of the timing diagram of FIG. 3. If the subscriber station 10 is in the speakerphone disabled state (i.e. not enabled) and an incoming call causes the telephone to ring, the subscriber station 10 decodes a signal on the telephone line and produces a ring signal during the period of such ring. If the subscriber activates the help button 18 so as to produce a help signal 60 during concurrent with the ring signal 62, the subscriber station 10 produces an off hook signal 64 and enters the speakerphone off hook, speakerphone disabled state 34 so as to permit speakerphone communication between the calling party and the subscriber. Following termination of the telephone conversation between the calling party and the subscriber, the subscriber station 10 will enter the on hook state 24 upon the detection of the call termination signal 66 produced in the manner previously described.

Another mode of operation for the subscriber station 10 is illustrated in the lower right hand portion of the timing diagram of FIG. 3. If the subscriber station 10 is in the hook disabled state 24 and the telephone rings, the subscriber can activate the help button 18 which produces a stand-by signal 53 concurrent with the ring signal 62. In response to the standby signal, the subscriber station 10 produces an off-hook signal 57, enters the speakerphone on hook-telephone off-hook state 29, and then transmits a wait message 55 to the incoming caller via the communications link 12. When the subscriber answers the phone, the subscriber station 10 enters either the speakerphone off hook state 34 upon detection of the help signal 60 or the telephone off hook speakerphone on hook state 36 upon the lifting of the telephone handset.

Figure 4:
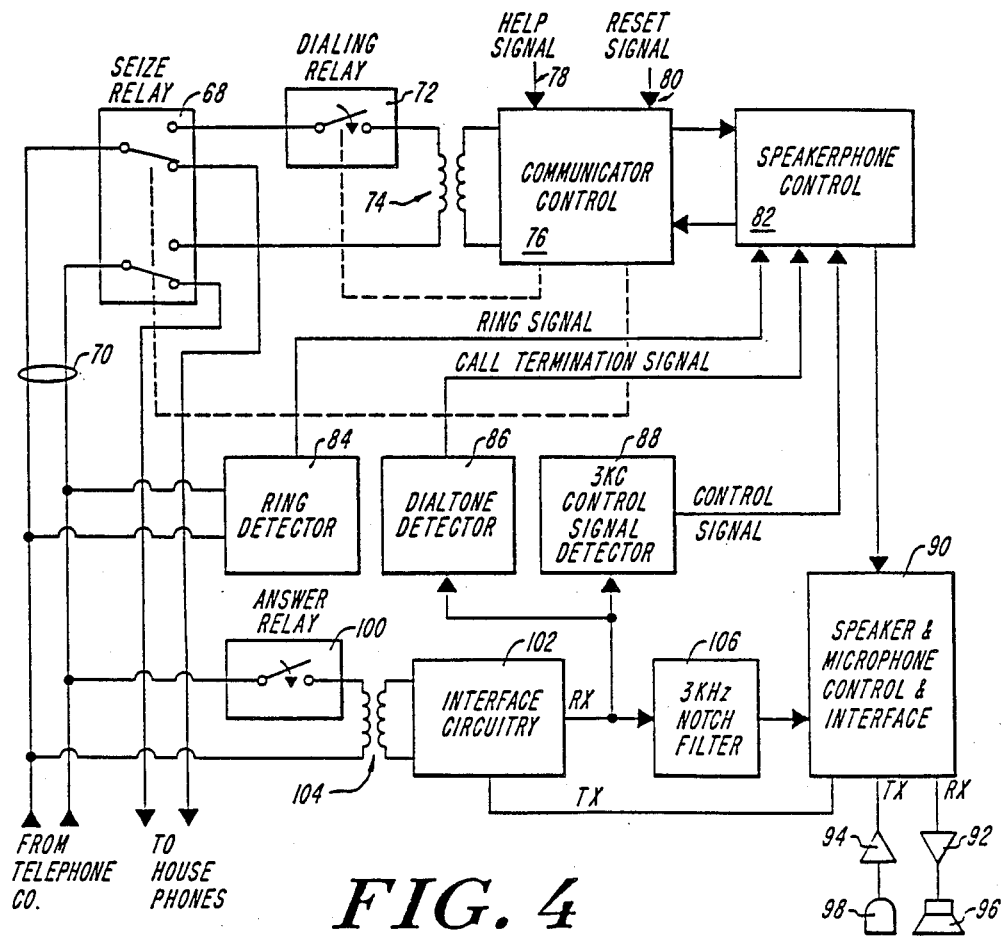
FIG. 4 is a detailed block diagram of the circuitry of the subscriber station and speakerphone illustrated generally in FIG. 1.

The invention is also depicted in block diagram form in FIG. 4 of the drawing. The speakerphone 20 is connected to the subscriber station 10 which is part of the personal alarm system previously described. The subscriber station 10 includes a relay 68 operative to seize the telephone line 70, and a dialing relay 72 coupled via a transformer 74 to a control 76 which typically is part of the subscriber station 10 of the personal alarm system. The control 76 receives inputs in the form of a help signal 78 and a reset signal 80. The help signal 78 is produced upon activation by a subscriber of the help button 18 of the hand held unit 16. As previously indicated, the hand held unit 16 may interface to the subscriber station 10 via a hard wired link, a radio frequency link, an infra red link, or via any other suitable means. The control 76 is coupled to the speakerphone control 82, which in turn receives inputs from a ring detector 84, dial tone detector 86, and a control signal detector 88. In the present embodiment, the control signal detector 88 is a tone detector operative to produce an output control signal upon detection of a 3 kilohertz tone. The ring detector 84, dial tone detector 86 and control signal detector 88 are operative to produce the ring signal, and call termination signal and a control signal respectively. The speakerphone control 82 produces a "speakerphone enabled" signal described in connection with FIG. 3 which serves to designate the system status and which functions as discussed in connection with FIG. 2. The speakerphone 20 includes speaker and microphone control and interface logic 90 which in turn is coupled via buffers 92 and 94 to a speaker 96 and a microphone 98, respectively.

The telephone line 70 is connected to an answer relay 100. The speakerhone 20 is connected through interface circuitry 102 to the telephone line 70 through a transformer 104 which, may be selectively disconnected via answer relay 100.

In a preferred embodiment of the invention, the control signal is produced upon detection of a 3 kilohertz tone, and the subscriber station 10 includes a 3 kilohertz notch filter 106 to prevent the undesired broadcast of this tone through the speakerphone 20.

It will be appreciated that the activation of the help button 18 to trigger the message unit 21, is but one way to trigger the message unit. Such triggering can be accomplished in many other ways, such as with a control button separate from the help button. Accordingly, the invention should in no way be limited to this illustrated implementation; rather, it should include any and all other implementations.

The above described personal alarm system is illustrative of a novel apparatus and method permitting handsfree operation by a subscriber who may be immobile, infirm, or otherwise incapacitated and who may be unable to operate a conventional telephone as a consequence thereof. It will be appreciated that other modifications, embodiments and departures from the present disclosure are possible without departing from the inventive concept contained herein. Consequently, the invention is to be viewed as embracing each and every novel feature and novel combination of features present in or possessed by the personal alarm system herein disclosed and is to limited solely by the scope and spirit of the appended claims.

What is claimed is:

1. For use in an emergency response system which includes:
   a subscriber station operative to communicate with a receiving station over a telephone communications link in response to an emergency condition and which provides via said telephone communications link a message including an indication of the emergency condition and the identity of said subscriber station;
   a receiving station operative to receive said message from said subscriber station via the telephone communications link and operative to send an accept signal via the telephone communications link to said subscriber station indicating that the message has been received;

the improvement at the subscriber station comprising:

means operative in response to a ring signal for producing a first signal;

means responsive to user activation for producing a second signal;

means responsive to the concurrent occurrence of said first signal and said second signal for placing the subscriber station in an off-hook condition and for producing a representation of a wait message; and means operative to send an electrical signal representative of the wait message to the calling party.

2. Apparatus for interfacing with a telephone network communications link, and operative to produce a wait message to a calling party while a user comes to the phone, comprising:

means responsive to a ring signal activation for producing a first signal;

means responsive to activation by said user for producing a second signal;

means responsive to the concurrent occurrence of said first signal and said second signal for placing the subscriber station in an off-hook condition and for producing a representation of said wait message; and means operative to send an electrical signal representative of the wait message to the calling party.

3. The apparatus of claim 2 wherein said wait message is a tone signal.

4. The apparatus of claim 2 wherein said wait message is a voice signal.

5. The apparatus of claim 2 including means for activating a voice channel to permit voice communication between said user and said calling party.

6. Apparatus for interfacing with a telephone network communications link, said link providing a ring signal indicating that a calling party desires to establish a telephonic communication with a user, a dial tone signal indicating that the link is available for use, said apparatus comprising:

means responsive to said ring signal for producing a first signal;

means responsive to activation by said user for producing a second signal;

means responsive to the concurrent occurrence of said first signal and said second signal for placing said apparatus in an off hook condition and for producing a representation of a wait message;

means operative to send electrical signals representative of said wait message to said calling party;

means responsive to activation by said user for producing a third signal;

means responsive to the concurrent occurrence of said first signal and said third signal for producing an activation signal;

speakerphone means operative to send electrical signals representative of the voice of said user in the vicinity of said speakerphone over said communications link and operative to receive from said communications link electrical signals representative of the voice of said calling party and to convert said received electrical signals to audible signals; and means coupling said speakerphone means to said telephone network communications link in response to said activation signal for providing voice communication over said communications link between said user and said calling party.

7. The apparatus of claim 6 including:

means coupled to said communication link for receiving said dial tone signal and for producing a deactivation signal in response thereto; and means responsive to said deactivation signal for decoupling said speakerphone from said communications link.

8. The apparatus of claim 6 including:

means responsive to a predetermined number of ring signals to place said apparatus in an off hook condition to permit voice communication between said user and said calling party.

9. Apparatus for activating electrical equipment at a first location so as to make connection between said equipment and a telephone network communications link, said link producing a ring signal to indicate to a user that a calling party desires to establish a telephonic communication, a dial tone signal indicating that the link is available for use, said electrical equipment at said first location providing a wait message to said calling party while said user comes to the telephone, and for transmitting information bi-directionally between said first location and a second location, said apparatus comprising:

means associated with said electrical equipment dispoed at said first location and responsive to said ring signal for producing a first signal;

means responsive to activation by said user for producing a standby signal;

means associated with said equipment disposed at said first location operative to receive said standby signal and to produce, in response thereto, a second signal;

means responsive to the concurrent occurrence of said first signal and said second signal for placing said electrical equipment at said first location in an off-hook condition, for making electrical connection between said electrical equipment and the telephone network communications link, and for transmitting a representation of said wait message over said communication link;

means responsive to activation by said user for producing an output signal;

means associated with said electrical equipment disposed at said first location operative to receive said output signal and to produce, in response thereto, a third signal;

means responsive to the concurrent occurrence of said first signal and said third signal for producing an activation signal and for making electrical connection between said electrical equipment and said telephone network communications link; and means responsive to said activation signal for communicating information over said telephone network.

10. The apparatus of claim 9 wherein said output signal and said standby signal are radio frequency signals.

11. The apparatus of claim 9 wherein said means responsive to said activation signal includes a telephone set.

* * * * *

UNITED STATES PATENT AND TRADEMARK OFFICE
CERTIFICATE OF CORRECTION

PATENT NO. : 4,760,593            (Page 1 of 2)

DATED : July 26, 1988

INVENTOR(S) : L. Dennis Shapiro; Robert M. Armington; Theodore Bially; Philip H. Devlin It is certified that error appears in the above-identified patent and that said Letters Patent is hereby corrected as shown below:

| | | |
|---|---|---|
| Column 1, | line 20, | "Clive" should read --live-- |
| | line 37, | "subscribers's" should read --subscriber's-- |
| Column 3, | line 42, | "transmit and" should read --transmit an-- |
| | line 61, | "therefore" should read --therefor-- |
| Column 4, | line 44, | "addistance" should read --assistance-- |
| Column 5, | line 27, | "speakerhone 20." should read --speakerphone 20.-- |
| Column 6, | line 19, | "and the" should read --and-- |
| | line 36, | "speakerpone" should read --speakerphone-- |
| | line 41, | "speakerhone" should read --speakerphone-- |
| | line 54, | "speakerpone" should read --speakerphone-- |
| Column 7, | line 22, | "includes a" should read --includes-- |
| | line 26, | "hand help" should read --hand held-- |
| | line 47, | "state 34," should read --state 24,-- |
| | line 56, | "one hook," should read --on hook,-- |
| Column 8, | line 3, | "state 24," should read --state 34,-- |
| | line 27, | "when in an" should read --when an-- |
| Column 9, | line 33, | "during concurrent with" should read --concurrent with-- |

UNITED STATES PATENT AND TRADEMARK OFFICE
CERTIFICATE OF CORRECTION

PATENT NO. : 4,760,593

DATED : July 26, 1988

INVENTOR(S) : L. Dennis Shapiro; Robert M. Armington; Theodore Bially; Philip H. Devlin It is certified that error appears in the above-identified patent and that said Letters Patent is hereby corrected as shown below:

Column 10, line 24, "speakerhone 20" should read --speakerphone 20-- line 53, "is to limited" should read --is to be limited--

Column 12, lines 30-31, "dis- poed" should read --dis- posed--

Signed and Sealed this

Twenty-sixth Day of September, 1989

Attest:

DONALD J. QUIGG

Attesting Officer

Commissioner of Patents and Trademarks